United States Patent [19]
Riffle et al.

[11] Patent Number: 5,266,644
[45] Date of Patent: Nov. 30, 1993

[54] PROCESS FOR PREPARING EPOXY-TERMINATED POLYMERS

[75] Inventors: Judy S. Riffle; John V. Facinelli, both of Blacksburg, Va.; John R. Dombroski, Kingsport, Tenn.; Ramesh B. Jayaraman, Blacksburg, Va.; Scott E. George, Kingsport, Tenn.

[73] Assignee: Eastman Kodak Company, Rochester, N.Y.

[21] Appl. No.: 970,219

[22] Filed: Nov. 2, 1992

[51] Int. Cl.$^5$ ............................................. C08F 8/08
[52] U.S. Cl. ...................................... 525/286; 525/102
[58] Field of Search ............................... 525/102, 286

[56] References Cited

U.S. PATENT DOCUMENTS

| | | | |
|---|---|---|---|
| 3,244,664 | 4/1966 | Zelinski . | |
| 3,692,874 | 9/1972 | Farrar . | |
| 4,097,643 | 6/1978 | Hasegawa | 525/286 |
| 4,185,042 | 1/1980 | Verkouw . | |
| 4,977,220 | 12/1990 | Dougherty . | |
| 5,008,342 | 4/1991 | Phadke | 525/286 |
| 5,066,726 | 11/1991 | Modic | 525/286 |

*Primary Examiner*—Bernard Lipman
*Attorney, Agent, or Firm*—John D. Thallemer; William P. Heath, Jr.

[57] ABSTRACT

The invention relates to epoxy-terminated polymers and copolymers derived from hydrosilyl-terminated hydrogenated polydienes and polyvinyl aromatics, and a process for preparing these polymers and copolymers. The epoxy-terminated polymers and copolymers are reactive with a variety of polymer functionalities such as carboxyl, hydroxyl, and amino groups to produce copolymers useful as molded articles and as compatibilizers for compositions containing polyesters and polyolefins.

28 Claims, No Drawings

PROCESS FOR PREPARING EPOXY-TERMINATED POLYMERS

FIELD OF THE INVENTION

The invention relates to epoxy-terminated polymers and copolymers derived from hydrosilyl-terminated hydrogenated polydienes and polyvinyl aromatics, and a process for preparing these polymers and copolymers. The epoxy-terminated polymers and copolymers are reactive with a variety of polymer functionalities such as carboxyl, hydroxyl, and amino groups to produce copolymers useful as molded articles and as compatibilizers for compositions containing polyesters and polyolefins.

BACKGROUND OF THE INVENTION

The use of silicic compounds to terminated living polyanions has been disclosed in U.S. Pat Nos. 3,244,664, 3,692,874, and 4,185,042.

U.S. Pat. No. 3,244,664 discloses a process for preparing a polymeric product by reacting a vinylidene-containing monomer which contains at least one terminal alkali metal atom with a silicic compound.

U.S. Pat. No. 3,692,874 discloses the use of conjugated dienes as accelerators to improve the coupling of alkali metal-terminated polymers with silicic coupling compounds.

U.S. Pat. No. 4,185,042 discloses coupling agents based on silicon compounds containing at least two alkoxy groups and an epoxide group.

U.S. Pat. No. 4,977,220 discloses epoxy-terminated oligomers prepared by reacting a 1,3-diolefin compound with a difunctional initiator to form an intermediate living oligomer having two ionic terminated groups. The intermediate living oligomer is reacted with a halohydrin compound to epoxidize the two anionic end groups and form an epoxy-terminated oligomer.

It has now been found that epoxy-terminated polymers can be prepared from hydrosilyl-terminated hydrogenated polydienes. Said process involves reacting a conjugated diolefin or monoalkenyl arene with an organoalkali metal compound to form a polydiene which is reacted with a silicic compound to form a hydrosilyl-terminated polydiene. The hydrosilyl-terminated polydiene is reacted with hydrogen gas to form a hydrosilyl-terminated hydrogenated polydiene which is reacted with an unsaturated epoxy compound.

SUMMARY OF THE INVENTION

It is therefore an object of the present invention to provide a new and improved epoxy-terminated polymer which is tough, flexible, stable, and has good processing characteristics.

Another object of the invention is to provide epoxy-terminated polymers which are reactive with a variety of functional polymers to produce copolymers useful as molded articles and as compatibilizers.

A further object of the invention is to provide a novel process for preparing epoxy-terminated polymers.

These and other objects are accomplished herein by a process for preparing an epoxy-terminated polymer comprising the following steps:

(I) reacting a conjugated diolefin or monoalkenyl arene with an organoalkali metal compound to form a polydiene, said conjugated diolefin having 4 to 12 carbon atoms per molecule;

(II) reacting the polydiene from Step (I) with a silicic compound to form a hydrosilyl-terminated polydiene, said silicic compound containing at least one silicon-hydrogen bond and at least one silicon-halogen bond and being selected from the group consisting of silanes having at least one silicon atom per molecule and open chain siloxanes having 2 to 12 silicon atoms per molecule;

(III) reacting the hydrosilyl-terminated polydiene from Step (II) with hydrogen gas in the presence of a soluble transition metal catalyst to form a hydrosilyl-terminated hydrogenated polydiene having at least 95% hydrogenation, said catalyst being provided in an amount of at least 0.05 mole percent based on the total amount of unsaturation in the hydrosilyl-terminated polydiene; and (IV) reacting the hydrosilyl-terminated hydrogenated polydiene from Step (III) with an unsaturated compound containing at least one epoxy group to form an epoxy-terminated hydrogenated polydiene.

The present invention is also directed to a process for preparing an epoxy-terminated polymer by substituting the conjugated diolefin with a monoalkenyl arene, and following the steps as described above.

DESCRIPTION OF THE INVENTION

The present invention relates to a process for the preparation of epoxy-terminated polymers. The process involves five steps. In the first step, a conjugated diolefin or monoalkenyl arene is reacted with an organoalkali metal compound to form a polydiene or a polyvinyl aromatic. The conjugated diolefin has 4 to 12 carbon atoms per molecule, preferably 4 to 8 carbon atoms per molecule. Conjugated diolefins containing halogen and alkoxy substituents also can be employed. Suitable conjugated diolefins include butadiene, isoprene, piperylene, 6-phenyl-1,3-hexadiene, and the like.

The monoalkenyl arene is preferably selected from the group consisting of styrene, the methylstyrenes, particularly 3-methylstyrene, the propylstyrenes, particularly 4-propylstyrene, vinylnaphthalene, particularly 1-vinylnaphthalene and 2-vinylnaphthalene, cyclohexylstyrenes, particularly 4-cyclohexylstyrene, p-tolylstyrene, and 1-vinyl 5-hexylnaphthalene.

The conjugated diolefins or monoalkenyl arenes are polymerized to form polydienes and/or polyvinyl aromatics or copolymers thereof by using organoalkali metal compounds as initiators. The copolymers of the conjugated diolefins and monoalkenyl arenes can be random, tapered, block or radial copolymers. The average number molecular weight of the polymers or copolymers should be in the range of about 1,000 to about 2,000,000. The presently preferred conjugated diolefin and monoalkenyl arene monomers are isoprene, 1,3-butadiene and styrene.

A preferred organoalkali metal compound is a hydrocarbyllithium compound where the hydrocarbon radical is selected from the group consisting of aliphatic, cycloaliphatic and aromatic radicals containing 1 to 20 carbon atoms, and where the lithium portion contains 1 to 4 lithium atoms. Alkyl monolithium compounds are preferred, especially n-butyllithium and sec-butyllithium. Examples of hydrocarbyllithium compounds which may be used include:
isopropyllithium,
n-butyllithium, tert-octyllithium,
n-decillithium,
phenyllithium,
naphthyllithium,
4-butylphenyllithium,
p-tolyllithium,
4-phenylbutyllithium,
cyclohexyllithium,
4-butylcyclohexyllithium,
4-cyclohexylbutyllithium,
dilithiomethane,
1,4-dilithiobutane,
1,10-dilithiodecane,
1,20-dilithioeicosane,
1,4-dilithio-2-butene,
1,8-dilithio-3-decene,
1,4-dilithiobenzene,
1,5-dilithionaphthalene,
1,2-dilithio-1,2-diphenylethane,
9,10-dilithio-9,10-dihydroanthracene,
1,2-dilithio-1,8-diphenyloctane,
1,3,5-trilithiopentane,
1,3,15-trilithioeicosane,
1,3,5-trilithiocyclohexane,
1,2,5-trilithionaphthalene,
1,3,5-trilithioanthracene,
1,3,5,8-tetralithiodecane,
1,5,10,20-tetralithioeicosane,
1,2,3,5-tetralithiocyclohexane,
1,2,3,5-tetralithio-4-hexylanthracene, and the like.

The dilithium adducts of 2,3-dialkyl-1,3-butadiene such as 2,3-dimethyl-1,3-butadiene and dilithium adducts of butadiene and isoprene containing from 1 to 10 diene units per molecule can also be used. The anionic polymerization procedures are known.

In the second step, the polydiene or polyvinyl aromatic from Step (I) is reacted with a silicic compound to form a hydrosilyl-terminated polydiene or hydrosilyl-terminated polydiene/polyvinyl aromatic copolymer. To be useful in the present invention, the silicic compounds must contain at least one Si-H bond and at least one Si-X bond, wherein X is halogen. Such silicic compounds include silanes containing at least one silicon atom per molecule and open chain siloxanes containing 2 to 12 silicon atoms per molecule. Preferably, the silicic compound is a silane having the general formula $R_nHSiX_{3-n}$ (Formula I), wherein R is hydrogen or an alkyl, cycloalkyl, aryl, alkaryl, or aralkyl radical containing from 1 to 20 carbon atoms; and X is halogen. Examples of the various types of silicic compounds include trifluorosilane, dichlorosilane, dimethylchlorosilane, trichlorosilane, dibromosilane, triiodosilane, and the like.

In the third step, the hydrosilyl-terminated polydiene or hydrosilyl-terminated polydiene/polyvinyl aromatic copolymer from Step (II) is reacted with hydrogen gas in the presence of a soluble transition metal catalyst to form a hydrosilyl-terminated hydrogenated polydiene or hydrosilyl-terminated hydrogenated polydiene/polyvinyl aromatic copolymer. The soluble transition metal catalyst should be provided in an amount of at least 0.05 mole percent, preferably 0.1 to 0.3 mole percent, based on the total amount of unsaturation in the hydrosilyl-terminated polydiene or hydrosilyl-terminated polydiene/polyvinyl aromatic copolymer. Hydrosilylation refers to the addition reaction of one or more Si-H groups to oxirane-functional ethylenic compounds. The present inventors have determined that at least 95%, and preferably greater than 97%, hydrogenation is necessary. Less than 95% hydrogenation results in side reactions which impair the performance and stability of the polymer. A preferred hydrosilylation catalyst is chloroplatinic acid.

Hydrogenation can be accomplished using numerous catalytic methods such as those that employ soluble transition metal catalysts. Particularly useful catalysts are prepared by reducing nickel or cobalt compounds with aluminum alkyl or organolithium. The soluble transition metal catalyst preferably is a trialkyl aluminum-nickel alkanoate complex such as triethyl aluminum-nickel octoate complex.

The hydrogenation may be conducted in a hydrocarbon solution, in the presence of polar additives and cosolvents, at temperatures in the range of 0° C. to 200° C., preferably in the range of 25° C. to 100° C. and partial pressures of hydrogen gas between 10 and 5000 psig, preferably in the range of 50 to 1000 psig. In some cases reagent excesses may serve as solvents and/or cosolvents for the hydrosilation reaction.

In the fourth step, the hydrosilyl-terminated hydrogenated polydiene or hydrosilyl-terminated hydrogenated vinyl aromatic from Step (III) is reacted with an unsaturated compound containing at least one epoxy group to form an epoxy-terminated hydrogenated polydiene, an epoxy-terminated hydrogenated polydiene/polyvinyl aromatic copolymer or combinations thereof. Polymers with more than one epoxide group at the chain terminus and starbranched polymers carrying epoxide functionalities at the locus of the chain junction and at the chain terminus are included within the scope of this invention.

Suitable unsaturated compounds which contain at least one epoxy group include glycidyl acrylate monomers having the formula (Formula II)

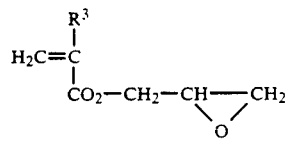

wherein $R^3$ is selected from the group consisting of hydrogen, alkyl groups containing 1 to 10 carbon atoms, and aromatic groups containing 6 to 20 carbon atoms. Exemplary alkyl groups suitable for $R^3$ are methyl, ethyl, propyl, and isobutyl, while exemplary aromatic groups suitable for $R^3$ include phenyl, tolyl, naphthyl, xylyl, and the like. Methyl, i.e., glycidyl methacrylate, is the most preferred. "Acrylate" as used herein refers to any of the acrylic acid-based groups included in Formula II. Suitable unsaturated epoxy compounds also include epoxy butene, glycidyl itaconate, allyl glycidyl ether, 2-methylallyl glycidyl ether p-styryl glycidyl ether and the like.

The epoxy compound can be contacted with the polydiene or vinyl aromatic under any reaction conditions, preferably elevated temperatures and pressures sufficient to maintain the reactants substantially in the liquid phase. Preferred reaction temperatures are from about −30° to about 150° C., more preferably from 0° to 120° C. Reaction times can be from about one second to about two hours.

Steps (I) through (IV) can be carried out in the presence or absence of a solvent but it is preferred to employ a solvent. Suitable solvents include linear, branched, and cyclic chain hydrocarbons, for example, cyclohexane or heptane. Aromatic hydrocarbon solvents may also be employed such as benzene, toluene, and xylene. In general, the polymerization reaction can be conducted in hydrocarbon solvents containing 4 to 12 carbon atoms, provided that the solvents do not contain acid hydrogens or other functionalities that would be deleteriously reactive with a living anion. These other types of solvents can be employed alone or in admixture with one another or in admixture with hydrocarbon diluents and the like. Cyclohexane is the preferred solvent.

The polymerization reaction can be modified by the presence therein of one or more polar compounds also known as polar modifiers selected from the group consisting of ethers, thioethers and tertiary amines. Specific examples of suitable polar modifiers include dimethyl ether, diethyl ether, ethyl methyl ether, ethyl propyl ether, dioxane, diphenyl ether, tripropyl amine, tributyl amine, trimethyl amine, triethyl amine, and N-,N-,N'-,N'-tetramethyl ethylene diamine, tetrahydrofuran, dipiperidinoethane, diglyme, anisole, crown ethers, and triglyme. Mixtures of the polar modifiers may also be used. The amount of the polar modifier depends on the type of the polar modifier and the polymerization conditions as will be apparent to those skilled in the art. The polar modifiers can be used to control the microstructure of the resulting polydiene. For example, polybutadiene can exist in the following 1,4 and 1,2 microstructural forms:

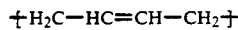

(1,4)

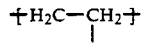

(1,2)

Additional microstructural forms will be possible for polydienes varying in structure or number of substituents. The polar modifiers may be present in amounts of about 100 percent of the total diluent volume, but preferably will constitute less than 20 percent of the diluent volume, and most preferably will be less than 1 percent. The effect of the polar modifiers on the polybutadiene microstructure is detailed in Antkowiak et al, *Temperature and Concentration Effects on Polar-Modified Alkyl Lithium Polymerizations and Copolymerizations*, Journal of Polymer Science: Part A-1, Vol. 10, 1319–1334 (1972), incorporated herein by reference. The polar compounds may also accelerate the rate of polymerization.

The polymerization reaction is usually conducted at a temperature of between 0° C. and about 100° C., although higher temperatures can be used. Control of a chosen reaction temperature is desirable since it can influence the effectiveness of the polar compound additive in controlling the polymer microstructure. The reaction temperature can be, for example, from 50° C. to 80° C. The reaction pressure is not critical and varies from atmospheric to about 100 psig.

The polymers of this invention can be recovered in any conventional manner such as by precipitating with a non-solvent. Any polymer non-solvent can be used. Preferably, the non-solvent is methanol, ethanol or isopropanol.

The epoxy terminal polymers and copolymers formed in accordance with the present invention are reactive with a variety of polymer functionalities such as carboxyl, hydroxyl, and amino groups to produce copolymers useful as molded articles and as compatibilizers for polyolefin-containing polymer blends. The only limitation on the polymers and copolymers is that they must be capable of reacting with an epoxy group. Blends containing polyesters or polyamides and polyolefins are preferred.

The invention will be further illustrated by a consideration of the following examples, which are intended to be exemplary of the invention. All parts and percentages in the examples are on a weight basis unless otherwise stated.

EXAMPLE 1

This example illustrates the preparation of an epoxy-terminated hydrogenated polyisoprene.

A mixture containing 15.3 grams of isoprene (0.225 moles) and 200 ml of cyclohexane was prepared. Agitation was applied and the mixture was heated to 55° C. before 5.5 ml (0.00765 moles) of sec-butyl lithium (1.4 molar solution in cyclohexane) was added. The temperature and agitation were maintained for 2.5 hours during which time a yellow colored mixture formed. The mixture was cooled to about 25° C. and 4 mls (0.0330 moles) of chlorodimethylsilane, which had been treated with calcium hydride and distilled, was added. The yellow color disappeared and the mixture became turbid. Agitation was continued for 32 hours at which time 0.075 (0.5 weight percent) Irganox 1070, a stabilizer, was added. A white precipitate of LiCl was filtered off and the solvent was removed in a rotary evaporator to isolate a Si H terminated polyisoprene which was dried under vacuum at 60°–70° C.

The Si-H terminated polyisoprene was epoxidized by charging 5.2 grams of allyl glycidyl ether (0.045 moles) into a two-necked round bottom reaction flask fitted with an addition funnel and a rubber septum. A thermocouple and a nitrogen inlet were inserted through the septum. A catalyst solution, 1.07 ml ($4.5 \times 10^{-5}$ moles of chloroplatinic acid which is $10^{-3}$ moles catalyst per mole of allyl glycidyl ether), prepared by dissolving 0.28 grams of chloroplatinic acid in 15 ml of allyl glycidyl ether, was added. The addition funnel was charged with a solution containing 5 grams of the above-described polyisoprene in 6 ml of allyl glycidyl ether. This solution was added to the reaction flask in increments of less than 0.5 ml under a slow stream of nitrogen. No measurable exotherm occurred. The reaction progress was monitored by following the disappearance of the Si-H peak at 2116 cm$^1$ in the infrared spectrum. After the addition was completed the reaction mixture was stirred for 12 hours at 25° C. Residual allyl glycidyl ether was removed under high vacuum at room temperature.

Hydrogenation of the epoxy-terminated polyisoprene having a theoretical average number molecular weight of about 2000 was accomplished as follows: In a flame dried flask, 7.15 grams of the oxirane functional polyisoprene was dissolved in 80 ml of cyclohexane and transferred to a dry Parr reactor under nitrogen. A nickel octanoate solution prepared by dissolving 3.0 grams of nickel octanoate in 300 ml of dry cyclohexane, 7.2 ml, (0.2 mole percent based on the number of double bonds to be hydrogenated) was charged to a separate flame dried bottle. The nickel octanoate solution was green. A 1.0 M triisobutylaluminum solution in toluene, 0.63 mls, (0.6 mole percent based on the number of double bonds to be hydrogenated) was added. Immediately, the green solution of nickel octanoate turned brown and colloidal nickel formed. The colloidal nickel was aged at about 25° C. for 15 minutes, and then transferred to the reactor containing the epoxy-terminated polyisoprene. The nitrogen was displaced by hydrogen at 50 psi of pressure and the reactor temperature was increased to 65°–70° C. with agitation. Disappearance of the double bonds was monitored by NMR, after 36 hours another catalyst addition containing 0.1 mole percent nickel was made. The reaction was allowed to proceed for another 8 hours under the same conditions, and then a final catalyst addition containing 0.1 mole percent nickel was made and the reaction was allowed to proceed for a final 8 hour time period. The epoxy-terminated hydrogenated polyisoprene product was isolated by precipitating the polymer into methanol and drying in a vacuum oven. Proton NMR analysis indicated that 97% of the double bonds were saturated without significant degradation of the epoxy groups.

EXAMPLE 2

This example illustrates the preparation of an epoxy-terminated hydrogenated polybutadiene with 97% 1,2-addition units and 3% 1,4-addition units.

A CHEMCO glass bowl reactor was charged with 400 ml of dry cyclohexane and cooled to 5° C. A 1.4 M cyclohexane solution of sec-butyl lithium, 9.5 ml was added to the reactor followed by 7 ml of dipiperidinoethane (DPIP) forming a yellow solution. 1,3-butadiene, 21.6 grams (0.399 moles) was added. The reaction temperature reached 8° C. After two hours, 5 ml of chlorodimethylsilane that had been degassed and freshly distilled from $CaH_2$ was added. An immediate decoloration followed by the formation of a gelatinous white precipitate. The mixture was stirred for 12 hours and then dissolved in ether and washed several times with water, followed by a 5% solution of hydrochloric acid to remove the DPIP. The organic phase was washed with sodium bicarbonate solution and water. After drying the organic phase over anhydrous sodium sulfate overnight, the solvent was removed to isolate a Si-H terminated polybutadiene, which was then stabilized with Irganox 1070 at a level of 0.5 weight percent.

The Si-H terminated polybutadiene was dissolved in 50 ml of dry cyclohexane and transferred to a Parr vessel under nitrogen. A 6 ml aliquot of nickel octanoate solution prepared by dissolving 3 grams of nickel octanoate in 300 ml of cyclohexane, (0.2 mole % nickel based on the total number of double bonds) was charged to a separate predried bottle, and a solution of a 1 M triisobutylaluminum solution in toluene, 0.52 ml, (3 moles Al per mole of nickel) was added. The colloidal nickel was aged at room temperature for 15 minutes before adding it to the reactor containing the polymer. The nitrogen in the Parr reactor was displaced with 50 psig of hydrogen and the reactor was heated to 65° C. and agitation was applied. The temperature was maintained at 65°–70° C. for 11 hours. NMR analysis indicated that the hydrogenation had proceeded to greater than 99% conversion. The contents were cooled and the solution was treated with a 5% solution of tartaric acid until the brown color associated with the residual catalyst disappeared. The aqueous and organic layers were separated and the polymer was isolated by removal of the solvent.

Allyl glycidyl ether, 4.8 grams, (0.421 moles) and 1.1 ml ($4.2 \times 10^{-5}$ moles) of chloroplatinic acid) added by means of a solution containing 0.33 grams of chloroplatinic acid in 20 ml of allyl glycidyl ether, were charged to a two-neck, round bottom flask fitted with an addition funnel and a rubber serum stopper. The polymer, 3.8 grams, was dissolved in a 1:1 mixture of THF and 8 ml of allyl glycidyl ether, and transferred to an addition funnel attached to the round bottom flask. The polymer solution was added to the alkyl glycidyl ether containing the catalyst incrementally over a period of time necessary to avoid an exotherm. The reaction was monitored with Infra Red Spectroscopy by observing the disappearance of the Si-H absorbance at 2116 $cm^1$. After all of the polymer solution was added, the reaction mixture was stirred overnight at 25° C. The allyl glycidyl ether was removed under reduced pressure without heating. The polymer was dissolved in a minimum of THF and precipitated into methanol. The epoxy-terminated hydrogenated polybutadiene was recovered.

EXAMPLE 3

This example illustrates the preparation of an epoxy-terminated hydrogenated polybutadiene with 70% 1,2-addition units and 30% 1,4-addition units.

A flame dried pressure bottle was charged with 170 ml of dry cyclohexane, 32 ml of dry THF, and 9.72 grams of purified 1,3-butadiene (0.18 moles). The mixture was cooled with a dry ice/isopropanol bath before 5.5 ml of sec-butyl lithium solution (1.1 M in cyclohexane) was added. Following such addition, the mixture turned yellow and the bath was removed. The mixture was stirred for 6 hours at 25° C. Chlorodimethylsilane, 4 ml (0.024 moles) was added. The yellow color of the solution disappeared immediately with the formation of a white LiCl precipitate. After stirring the reaction mixture overnight at room temperature the polymer was stabilized with 0.049 grams (0.5 weight percent) Irganox 1070. Lithium chloride was filtered off and the solvent was removed to obtain the polymer, which was analyzed by NMR and found to contain 70% 1,2- and 30% 1,4- microstructure.

The polymer, 4.8 grams, was dissolved in 50 ml of cyclohexane in a dry flask and transferred to a predried Parr reactor under nitrogen. In a separate bottle, 6.5 ml of a nickel octanoate solution prepared by dissolving 3 grams of nickel octanoate in 300 ml of cyclohexane (0.2 mole % based on the total double bonds) was charged via syringe and mixed with 0.6 ml of a 1 M triisobutylaluminum solution in toluene. The brown solution that formed was aged at room temperature for 15 minutes and then transferred via syringe into the reactor containing the polymer solution. The nitrogen blanket was replaced with 50 psig of hydrogen and the reactor was heated to 65°–70° C. and maintained for 5.5 hours.

NMR showed almost complete disappearance of the olefinic hydrogens. The reaction mixture was cooled and treated with 5% tartaric acid solution until the brown color, due to residual nickel, disappeared. The organic and aqueous phases were separated and the organic portion was concentrated to yield a clear polymer. Proton NMR indicated that the hydrogenation was at least 97% complete.

Allyl glycidyl ether, 4.8 grams, (0.421 moles) and 1.1 ml ($4.2 \times 10^5$ moles) of a chloroplatinic acid solution prepared by dissolving 0.33 grams of chloroplatinic acid in 20 ml of allyl glycidyl ether, were charged to a two-neck, round bottom flask fitted with an addition funnel and a septum stopper. The addition funnel was charged with 3.2 grams of the polymer in a 1:1 mixture of allyl glycidyl ether and distilled THF. A thermocouple and a nitrogen inlet were inserted through the septum, and a slow stream of nitrogen was started to blanket the reaction mixture. The polymer solution was added in portions and Infra Red Spectroscopy was used to monitor the reaction after each addition. After all of the polymer solution was added the reactor contents were allowed to stir for 12 hours at 25° C. Activated charcoal was used to remove color bodies, due to residual catalyst, from the crude mixture. The solution was concentrated and the small amount of residual allyl glycidyl ether was removed under high vacuum without heating. The recovered polymer was heated under vacuum at 80° C. for 12 hours during which time the polymer turned a yellow color. A brown color results when the activated charcoal treatment is omitted.

Many variations will suggest themselves to those skilled in this art in light of the above detailed description. All such obvious modifications are within the full intended scope of the appended claims.

What is claimed is:

1. A process for preparing an epoxy-terminated polymer/comprising the following steps:
   (I) reacting a conjugated diolefin with an organoalkali metal compound to form a polydiene, said conjugated diolefin having 4 to 12 carbon atoms per molecule;
   (II) reacting the polydiene from Step (I) with a silicic compound to form a hydrosilyl-terminated polydiene, said silicic compound containing at least one silicon-hydrogen bond and at least one silicon-halogen bond and being selected from the group consisting of silanes having at least one silicon atom per molecule and open chain siloxanes having 2 to 12 silicon atoms per molecule;
   (III) reacting the hydrosilyl-terminated polydiene from Step (II) with hydrogen gas in the presence of a soluble transition metal catalyst to form a hydrosilyl-terminated hydrogenated polydiene having at least 95% hydrogenation, said catalyst being provided in an amount of at least 0.05 mole percent based on the total amount of unsaturation in the hydrosilyl-terminated polydiene; and
   (IV) reacting the hydrosilyl-terminated hydrogenated polydiene from Step (III) with an unsaturated compound containing at least one epoxy group to form an epoxy-terminated hydrogenated polydiene.

2. A process for preparing an epoxy-terminated polymer/comprising the following steps:
   (I) reacting a monoalkenyl arene with an organoalkali metal compound to form a polyvinyl aromatic, said monoalkenyl arene being selected from the group consisting of styrene, methylstyrene, propylstyrene, vinylnaphthalene, cyclohexylstyrene and combinations thereof;
   (II) reacting the polyvinyl aromatic from Step (I) with a silicic compound to form a hydrosilyl-terminated polyvinyl aromatic, said silicic compound containing at least one silicon-hydrogen bond and at least one silicon-halogen bond and being selected from the group consisting of silanes having at least one silicon atom per molecule and open chain siloxanes having 2 to 12 silicon atoms per molecule;
   (III) reacting the hydrosilyl-terminated polyvinyl aromatic from Step (II) with at least one unsaturated epoxy compound to form an epoxy-terminated polyvinyl aromatic.

3. The process of claim 1 wherein the conjugated diolefin is selected from the group consisting of butadiene, isoprene, piperylene, 2,3-dimethyl-1,3-butadiene, and mixtures thereof.

4. The process of claim 3 wherein the conjugated diolefin is butadiene.

5. The process of claim 3 wherein the conjugated diolefin is isoprene.

6. The process of claim 2 wherein the monoalkenyl arene is selected from the group consisting of 3-methylstyrene, 4-propylstyrene, 1-vinylnaphthalene, 2-vinylnaphthalene, 4-cyclohexylstyrene, p-tolylstyrene, and 1-vinyl-5-hexylnaphthalene.

7. The process of claim 1 wherein the organoalkali metal compound is a hydrocarbyllithium compound having 1 to 20 carbon atoms and 1 to 4 lithium atoms.

8. The process of claim 7 wherein the organoalkali metal compound is an alkyl monolithium compound.

9. The process of claim 8 wherein the alkyl monolithium compound is an isomer of butyllithium.

10. The process of claim 2 wherein the organoalkali metal compound is a hydrocarbyllithium compound having 1 to 20 carbon atoms and 1 to 4 lithium atoms.

11. The process of claim 10 wherein the organoalkali metal compound is an alkyl monolithium compound.

12. The process of claim 11 wherein the alkyl monolithium compound is an isomer of butyllithium.

13. The process of claim 1 wherein the silicic compound is a silane having the formula $R_nHSiX_{3-n}$, wherein R is selected from the group consisting of hydrogen, an alkyl, cycloalkyl, aryl, alkaryl, and aralkyl radical containing from 1 to 20 carbon atoms; and X is halogen.

14. The process of claim 1 wherein the silicic compound is selected from the group consisting of dichlorosilane, dimethylchlorosilane, trichlorosilane, dibromosilane, and triiodosilane.

15. The process of claim 2 wherein the silicic compound is a silane having the formula $R_nHSiX_{3-n}$, wherein R is selected from the group consisting of hydrogen, an alkyl, cycloalkyl, aryl, alkaryl, and aralkyl radical containing from 1 to 20 carbon atoms; and X is halogen.

16. The process of claim 2 wherein the silicic compound is selected from the group consisting of dichlorosilane, dimethylchlorosilane, trichlorosilane, dibromosilane, and triiodosilane.

17. The process of claim 1 wherein the soluble transition metal catalyst is a trialkyl aluminum-nickel alkanoate complex.

18. The process of claim 17 wherein the trialkyl aluminum-nickel alkanoate complex is triethyl aluminum-nickel octoate complex.

19. The process of claim 1 wherein the soluble transition metal catalyst is an alkyl lithium-cobalt alkanoate complex.

20. The process of claim 2 wherein the soluble transition metal catalyst is a trialkyl aluminum-nickel alkanoate complex.

21. The process of claim 20 wherein the trialkyl aluminum-nickel alkanoate complex is triethyl aluminum-nickel octoate complex.

22. The process of claim 2 wherein the soluble transition metal catalyst is an alkyl lithium-cobalt alkanoate complex.

23. The process of claim 1 wherein the unsaturated compound containing at least one epoxy group is selected from the group consisting of glycidyl acrylate, epoxy butene, glycidyl itaconate, allyl glycidyl ether, 2-methylallyl glycidyl ether p-styryl glycidyl ether and combinations thereof.

24. The process of claim 23 wherein the glycidyl acrylate has the formula

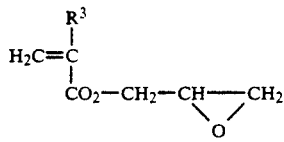

wherein $R^3$ is selected from the group consisting of hydrogen, alkyl groups containing 1 to 10 carbon atoms, and aromatic groups containing 6 to 20 carbon atoms.

25. The process of claim 24 wherein the glycidyl acrylate is glycidyl methacrylate.

26. The process of claim 2 wherein the unsaturated compound containing at least one epoxy group is selected from the group consisting of glycidyl acrylate, epoxy butene, glycidyl itaconate, allyl glycidyl ether, 2-methylallyl glycidyl ether p-styryl glycidyl ether and combinations thereof.

27. The process of claim 26 wherein the glycidyl acrylate has the formula

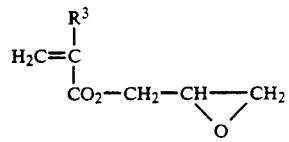

wherein $R^3$ is selected from the group consisting of hydrogen, alkyl groups containing 1 to 10 carbon atoms, and aromatic groups containing 6 to 20 carbon atoms.

28. The process of claim 27 wherein the glycidyl acrylate is glycidyl methacrylate.

* * * * *